April 18, 1939.　　　H. K. MARTIN　　　2,154,574
GROUND GLASS JOINT
Filed May 24, 1938
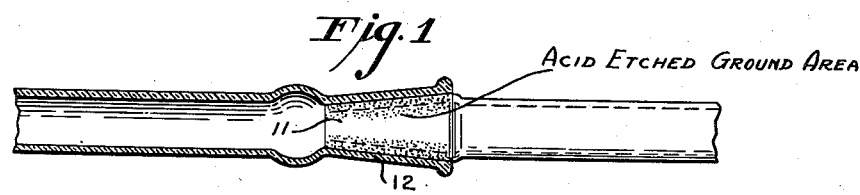
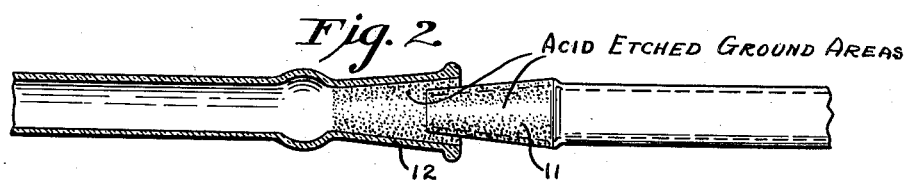
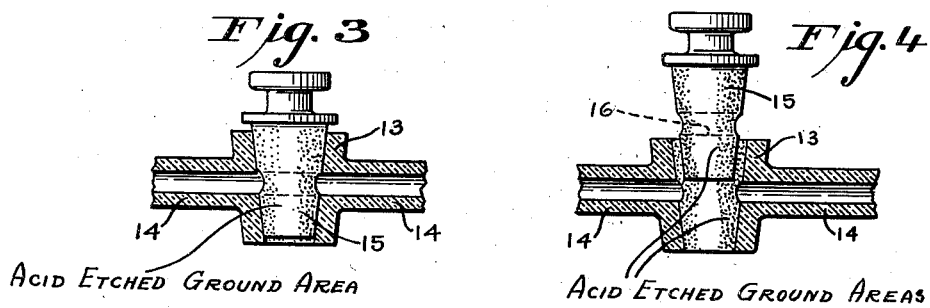
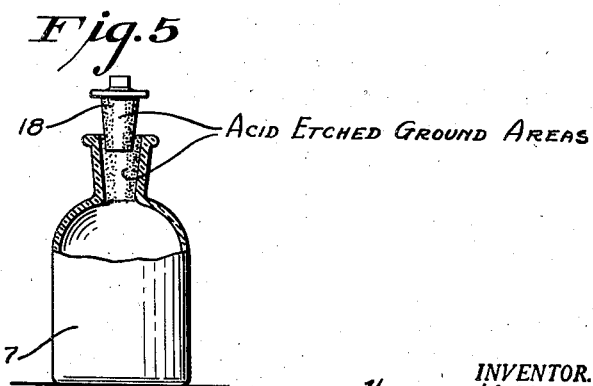
INVENTOR.
HAROLD K. MARTIN
BY *Dorsey, Cole + Garner*
ATTORNEYS.

Patented Apr. 18, 1939

2,154,574

UNITED STATES PATENT OFFICE 2,154,574

GROUND GLASS JOINT

Harold Kaye Martin, Beaver Dams, N. Y., assignor to Corning Glass Works, Corning, N. Y., a corporation of New York Application May 24, 1938, Serial No. 209,853

7 Claims. (Cl. 215—47)

This invention relates to glass joints formed between coacting glass parts, the surfaces of which have been matched by grinding them together.

Heretofore it has been common experience among chemists that a glass bottle stopper, which has been fitted into the neck of a glass chemical reagent bottle by grinding the coacting surfaces of bottle neck and stopper together, may subsequently stick so tightly into the bottle neck that it cannot be loosened without breakage of either the bottle or the stopper. Under such conditions not only may valuable contents of the bottle be lost, but there is the possibility of resulting personal injury, due to cuts and chemical burns which may follow such breakage.

The primary object of my invention is to prevent sticking between two coacting ground glass surfaces, such as the stoppered neck closures for glass chemical reagent bottles, glass turning plugs and glass barrels of stopcocks and the male and female members of ground joints.

Another object is to eliminate the necessity of using a lubricant between the plug and barrel of a glass stopcock.

The above and other objects may be attained by employing my invention, which embodies among its features a ground glass joint, at least one of whose contacting ground glass surfaces is acid etched.

Referring to the drawing:

Fig. 1 illustrates a typical tapered tubular glass joint such as used in both chemical and physical apparatus which is improved in accordance with my invention;

Fig. 2 illustrates the manner of engaging the joint of Fig. 1;

Fig. 3 illustrates a typical glass stopcock improved in accordance with my invention;

Fig. 4 is another view of the stopcock of Fig. 3, showing the glass plug out of engagement with the glass barrel; and Fig. 5 is an elevation, partly in section, of a glass chemical reagent bottle having a tapered ground glass stopper which has been improved in accordance with my invention.

In forming mechanical joints between sections of glass tubing, it is customary to form plug and barrel sections 11 and 12 as shown in Figs. 1 and 2 so that these parts have a tapered external and a tapered internal surface, respectively, of substantially identical configuration. Thereafter it is customary to grind said surfaces until a substantially perfect fit is obtained between them. A suitable lubricant is applied between the co-acting ground surfaces to prevent sticking and to assure a leak-proof joint when the members are in full surface contact.

I have discovered that excessive sticking between the parts of a ground glass joint is due to the interlocking of the minute angular excrescences of the ground surfaces with decomposition products of the glass or other foreign crystal growth and that such interlocking may largely if not entirely be prevented by treating the ground glass surfaces with a glass solvent such as hydrofluoric acid for a time sufficient to round off such excrescences.

In carrying my invention into practice I first form a glass joint, in the customary manner, by grinding a preformed glass male member to fit the inner surface of a corresponding female member, and then I subject at least one of the ground surfaces to the action of a glass solvent such as hydrofluoric acid for about one minute and thereafter wash the treated surface with water. Since some glass constituents, such as lime, lead, etc., form insoluble fluorides which interfere with the treatment, it is preferable to subject the surface to repeated treatments of about ten seconds each, the fluorides being removed after each treatment by washing. Ten treatments of ten seconds each are ample. A suitable acid solution comprises equal parts of 60% hydrofluoric acid and concentrated sulfuric acid. Weaker solvents may be used for correspondingly longer times.

Care should be exercised not to remove too much of the glass surface because the accurate fit of the matched members would thereby be impaired. Hence a finely ground surface is preferable to one which has been coarsely ground. Either one or both of the members may be treated, but it is obviously easier to treat only the male member.

The present invention is further illustrated in Figs. 3 and 4 as applied to a common type of stopcock. This article includes a tapered barrel portion 13 let into a piece of tubing 14 and a plug 15 shaped to conform to the inside of the barrel 13. An opening 16 formed in the plug 15 is so positioned as to form a continuation of the bore of the tubing 14 when positioned in alignment therewith. Such stopcocks have customarily been provided with matching ground surfaces on their barrels and plugs which surfaces had to be lubricated to prevent sticking. According to the present invention, ample freedom of movement between the parts is obtained and maintained by merely fortifying, that is, etching one or both of the usual ground surfaces of the joint in the manner explained above.

Similarly Fig. 5 illustrates a typical glass reagent bottle 17 provided wtih a glass stopper 18. The interior surface of the bottle neck and the exterior surface of the stopper are tapered and ground to provide a perfect matching fit. As in the other articles described above, freedom of the parts from sticking may be obtained without the use of lubricants by etching one or preferably both of the ground surfaces in the manner herein described.

The surfaces of ordinary ground glass joints, when examined under the microscope, preferably with a magnification of eighty diameters, consist of minute sharp angular projections. Surfaces that have been treated by my process have a uniformly nodulated appearance and are free from sharp angles and pointed excrescences.

In testing the efficiency of my process I have found that glass stoppered reagent bottles that had been subjected to the above described treatment and filled with a 4% water solution of sodium hydroxide have shown no tendency for the stoppers to become stuck on standing for four months. On the other hand, similar bottles that had not been so treated became stuck within one week and some of the stoppers could not be removed by any means short of breaking the bottles.

Having thus described my invention, what I claim is:

1. A joint between glass members, comprising coacting matched ground areas, at least one of said areas being acid etched.

2. A joint between glass members comprising coacting matched ground areas which have been acid etched.

3. A glass bottle having a neck opening and a glass stopper ground to fit therein, at least one of the ground areas being acid etched.

4. A glass bottle having a neck opening and a glass stopper ground to fit therein, the cooperating matched ground areas being acid etched.

5. A glass stopcock, comprising a glass barrel and a glass plug to fit within the barrel, at least one of the cooperating surface areas having been acid etched.

6. A ground glass joint at least one of the members of which has a surface of rounded nodules as viewed with a microscope.

7. A ground glass joint at least one of the members of which has a surface formed of rounded projections of microscopic dimensions.

HAROLD KAYE MARTIN.